United States Patent [19]
Chevalier et al.

[11] Patent Number: 5,572,697
[45] Date of Patent: Nov. 5, 1996

[54] APPARATUS FOR RECOVERING LOST BUFFER CONTENTS IN A DATA PROCESSING SYSTEM

[75] Inventors: Denis Chevalier, La Colle Sur Loup; Jean Calvignac, La Gaude; Jean-Marie Munier, Cagnes-sur-Mer; Bernard Naudin; Maurice Duault, both of Saint Laurent du Var, all of France

[73] Assignee: International Business Machines Corporation, Armonk, N.Y.

[21] Appl. No.: 992,314

[22] Filed: Dec. 21, 1992

[30] Foreign Application Priority Data

Mar. 2, 1992 [EP] European Pat. Off. .............. 92480009

[51] Int. Cl.⁶ ..................................................... G06F 13/00
[52] U.S. Cl. .......................... 395/427; 395/250; 395/457
[58] Field of Search ..................................... 395/325, 250, 395/200, 427; 364/200

[56] References Cited

U.S. PATENT DOCUMENTS

| | | | |
|---|---|---|---|
| 4,040,026 | 8/1977 | Gernelle | 395/250 |
| 4,453,216 | 6/1984 | Chiba et al. | 395/872 |
| 4,821,185 | 4/1989 | Esposito | 395/872 |
| 5,333,269 | 7/1994 | Calvignac et al. | 395/200.08 |
| 5,452,430 | 9/1995 | Dievendorff et al. | 395/183.13 |

FOREIGN PATENT DOCUMENTS 0365731  5/1990  European Pat. Off. ........ G06F 15/16

OTHER PUBLICATIONS

Andrew S. Tanenbaum, Modern Operating System, 1992, pp. 110–111.

Primary Examiner—William M. Treat
Assistant Examiner—Kenneth R. Coulter
Attorney, Agent, or Firm—John J. Timar; Edward H. Duffield

[57] ABSTRACT

Apparatus for recovering lost buffer contents in a data processing system uses a memory divided into a plurality of buffers provided with buffer control blocks, through which source and destination users exchange information. A buffer management circuit is responsive to requests from users for allocating buffers to source users in order that source users may store the information to be sent to the destination users. This circuit builds buffer queues and dequeues buffers from the queues to send the information contained therein to the destination users and releases the buffers afterwards. A time mark register is settable to n different values in a predetermined order. The value of the time mark register is changed at the expiration of a time period P. Each time a buffer is allocated to one user, the current value of the time mark register is written into a time mark field of the buffer control block and a state field is set to a first value (leased). When the buffer is released, the state field is set to a second value (released). The contents of the buffer control blocks are read at regular time intervals t after period P, and the state field of every buffer control block is tested to determine whether it is set to the second value. If not so set, the time mark field is compared with the value the time mark register had at the time t-xP, where x is a number such as 1<x<n, and the buffer is released in case of equality.

4 Claims, 12 Drawing Sheets

PRIOR ART

GLOBAL ORDER REQUEST/RESPONSE FORMAT.
DST/ORG : DESTINATION/ORIGIN FIELD
GO TYPE: GLOBAL ORDER TYPE.

FIG. 4

B C B (BUFFER CONTROL BLOCK)

M C C B (MESSAGE CHAINING CONTROL BLOCK)

B C C B (BUFFER CHAINING CONTROL BLOCK)

APPARATUS FOR RECOVERING LOST BUFFER CONTENTS IN A DATA PROCESSING SYSTEM

DESCRIPTION OF THE INVENTION

The present invention relates to an apparatus allowing lost buffers to be recovered in a data processing system wherein different users have access to a shared memory for enqueueing/dequeueing messages to/from buffer queues.

BACKGROUND ART

A data processing system wherein messages are transferred between users through a shared memory is described in EP-A-0 365 731.

This system is based on a specific memory organization and hardware assist circuits which facilitates the memory queue management.

The memory comprises a linear space and a buffer-organized space. Each page of the buffer-organized space is divided in a number m+1 of buffers of equal capacity, with m buffers devoted to the storage of message data and one control buffer divided into m control blocks. There is a fixed relationship between each buffer control block and each data buffer. The control blocks are dedicated to the storage of buffer and message chaining information.

The linear space comprises queue control blocks. The messages are received from the source users and enqueued in inbound queues which are dynamically built by taking buffers from the buffer-organized space, chaining the buffers by writing buffer and message chaining information in the corresponding buffer control blocks, and writing the queue head and queue tail addresses in the corresponding queue control blocks.

A centralized control circuit is designed to process lease, enqueue, dequeue and release orders upon requests from a user selected by an arbiter.

When an inbound queue of a source user becomes not empty, a receive hardware assist circuit sends a dequeue order request to the centralized control circuit, the dequeue order request identifying the corresponding queue control block. The message address is provided in response thereto with the identification of the queue control block of the destination user.

Then, the receive hardware assist circuit sends an enqueue order request to the centralized control circuit, said request identifying the address of the message to be enqueued and the queue control block of the destination user. The processing of this enqueue request by the centralized control circuit causes the messages to be enqueued to an outbound message queue. They are transmitted to the destination user by a transmit hardware assist circuit.

The free buffers of the buffer-organized space constitute a free buffer queue in which the buffers are chained via their buffer control blocks, the free buffer queue having a queue control block which contains the addresses of the queue head and queue tail. Buffer addresses are provided to a user in response to a lease order request.

There are different types of users such as hardware users which are communication adapters receiving/transmitting messages from/to communication links and at least one software user which comprises a microprocessor for processing the messages, i.e. performing the message routing or other operations. In case of any malfunction, the hardware users or software user may lose the control of buffers.

Each buffer or set of buffers is owned at a given time by a user. If there were only software users, one solution to recover the lost buffers would consist of keeping track of the users to which buffers are allocated and recovering the associated buffers in case of failure of a user.

This solution is valid in a software environment. It cannot be implemented in the environment previously described for performance reasons, because the control microcode which keeps track of the buffer allocations would have to be aware of all message transfers and of all buffer lease and release operations.

SUMMARY OF THE INVENTION

In the above described environment, an object of the present invention is to provide a simple apparatus which allows the recover of lost buffers in a very simple and efficient way.

The apparatus according to the subject invention can be implemented in any data processing system comprising a memory divided into a plurality of buffers provided with buffer control blocks, by means of which source and destination users exchange information. Buffer management means are responsive to requests from users for allocating buffers to source users in order for the source users to store the information to be sent to the destination users; for building buffer queues; for dequeueing buffers from the buffer queues to send the information contained therein to the destination users; and for releasing the buffers afterwards.

The apparatus is characterized in that it comprises:

—timing means settable to n different values in a predetermined order, the value of the timing means being changed at the expiration of a time period P, —time marking means for writing the current value of the timing means into a time mark field of the buffer control blocks when the buffers are allocated to users, —state field writing means for writing into a state field (ST) of the buffer control blocks, a first value (leased) when the buffers are allocated to users and a second value (released) when the buffers are released, —scanning means for reading the contents of said control blocks at regular time intervals t after expiration of time period P, testing if the state field of every buffer control block is set to the second value, and if not, comparing the time mark field with the value the timing means had at the time t−xP, where x is a number such as 1<x<n, and releasing the corresponding buffer in case of equality.

In a preferred embodiment of the present invention n is equal to 3 and x is equal to 2.

According to an additional feature of the present invention, the state field writing means write the state field of the buffer control blocks at a third value (queued) when the corresponding buffers pertain to a queue, and the scanning means test if the state field of each read buffer control block is set to the third state in case an equality is found as a result of the comparison of the time mark field, and if it is found equal to the third value, dequeue all the buffers of the queue to which the buffer pertain, and release the buffer.

In addition, it comprises means for setting the time mark field of the buffer control block of a buffer when allocated to one user which makes a special request for the allocation of a permanently assigned buffer to a value different from the n values of the timing means, whereby the corresponding buffer is not released by the scanning means.

DETAILED DESCRIPTION OF THE INVENTION

The subject invention can be implemented in any data processing system wherein data or messages are exchanged between users through enqueuing/dequeuing operations in buffer queues. Such a system is described in EP-A-0365731 and in the corresponding U.S. Pat. No. 5,333,269; the detailed description of the invention will be made in the context of that environment.

Figure 1:
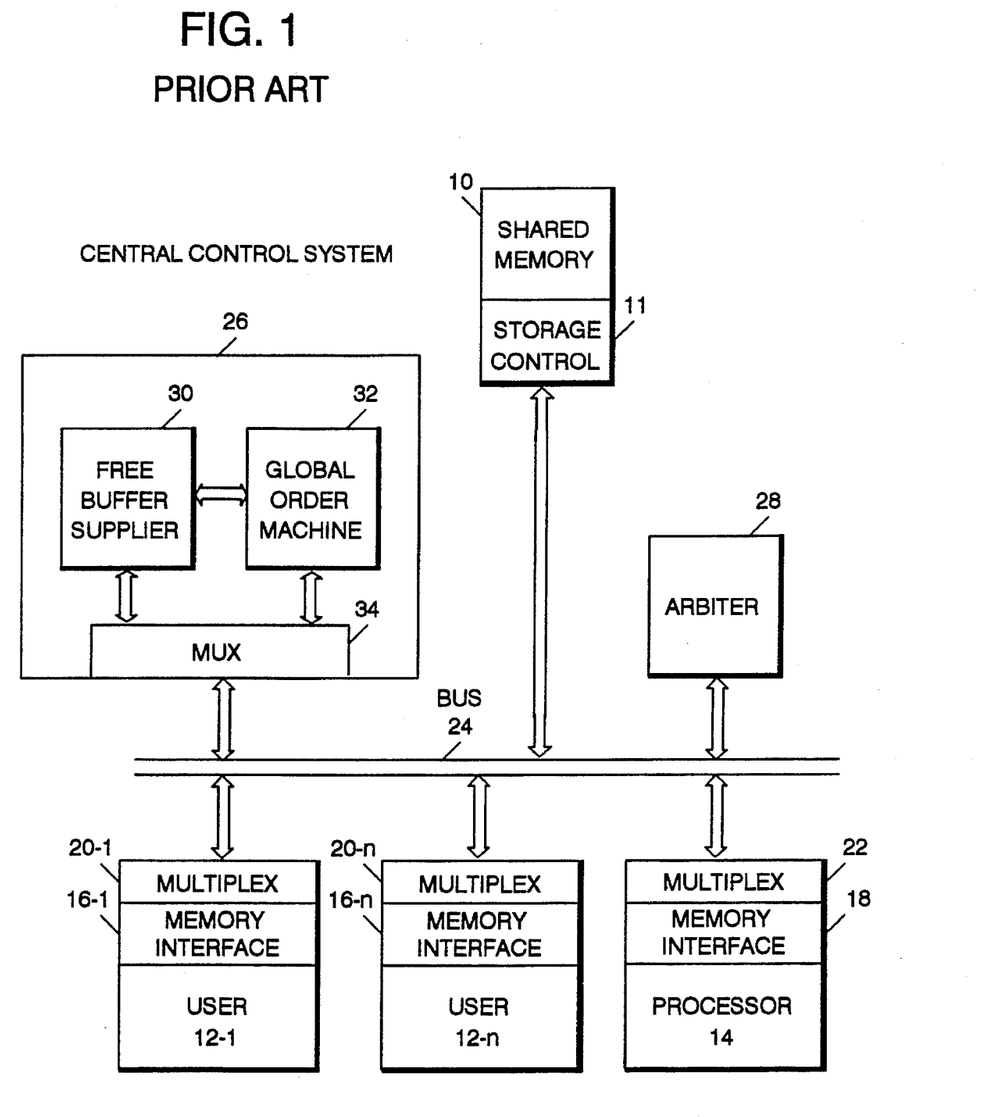
FIG. 1 shows the block diagram of a system in which the present invention can be implemented.

The block diagram of the system described in EP-A-0365731 is shown in FIG. 1. It comprises a shared memory 10 and storage control circuit 11 accessible by different hardware users 12-1 to 12-n which may be communication adapters and a specific software user which is a processor 14, through memory interfaces 20-1 to 20-n and 22, and bus 24.

The enqueuing/ dequeuing operations of the messages to be exchanged between the users are controlled by a central control system 26. The bus accesses are managed by an arbiter 28.

The memory interfaces 16-1 to 16-n and 18 and the central control system 26 are attached to the bus 24 through multiplexing circuits 20-1 to 20-n, 22 and 34 which allow logical entities to be put on the bus 24 or received from the bus by a device 16-1 to 16-n, 18 or 26 selected by the arbiter 28.

The memory interfaces 16-1 to 16-n perform the chaining of the messages received from the users 12-1 to 12-n and request the enqueuing of the messages in user inbound queues by the central control system 26. They also perform the sending of the messages dequeued from user outbound queues to destination users.

Messages can be directly routed from source users to destination users as described above. Also, the routing can be performed by processor 14 which causes messages to be dequeued from the user inbound queues, enqueued to a microcode inbound queue, and processed by the processor and then enqueued to the destination user outbound queues.

The central control system 26 comprises a so-called global order machine 32 which receives global orders from requesting interfaces 20-1 to 20-n and 22, processes these orders and generate responses which are sent to the requesting interfaces.

These global orders are "Enqueue", "Dequeue", "Lease", "Release" orders are described in the above referenced European Patent application.

The central control system 26 also comprises a free buffer supplier circuit 30 which issues Dequeue-Free global orders to the global order machine 32.

In response to the Dequeue-Free order, the address of a free buffer which is dequeued from the queue of free buffers in memory 10 is stored in a random access memory in free buffer supplier circuit 30, called leased buffer pool and able to contain a plurality of such leased buffer addresses. One address can be provided to any requester through a lease global order.

Each queue in memory 10 is made of buffers which are chained through buffer control blocks. The starting and ending addresses of the queues are contained in queue control blocks.

Figure 2A:
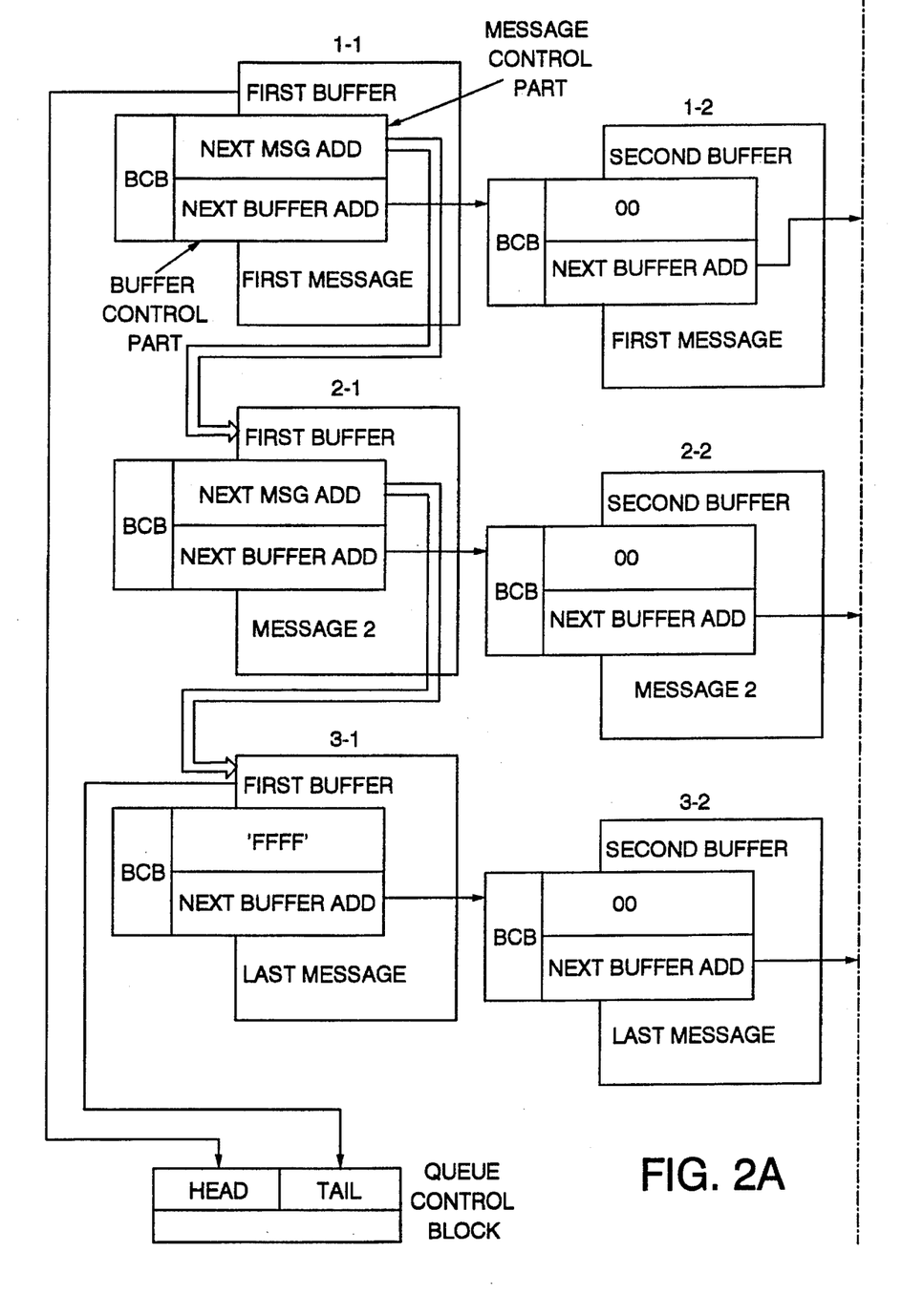
FIG. 2 shows the buffer and message chaining in the memory 10 of FIG. 1.
Figure 2B:
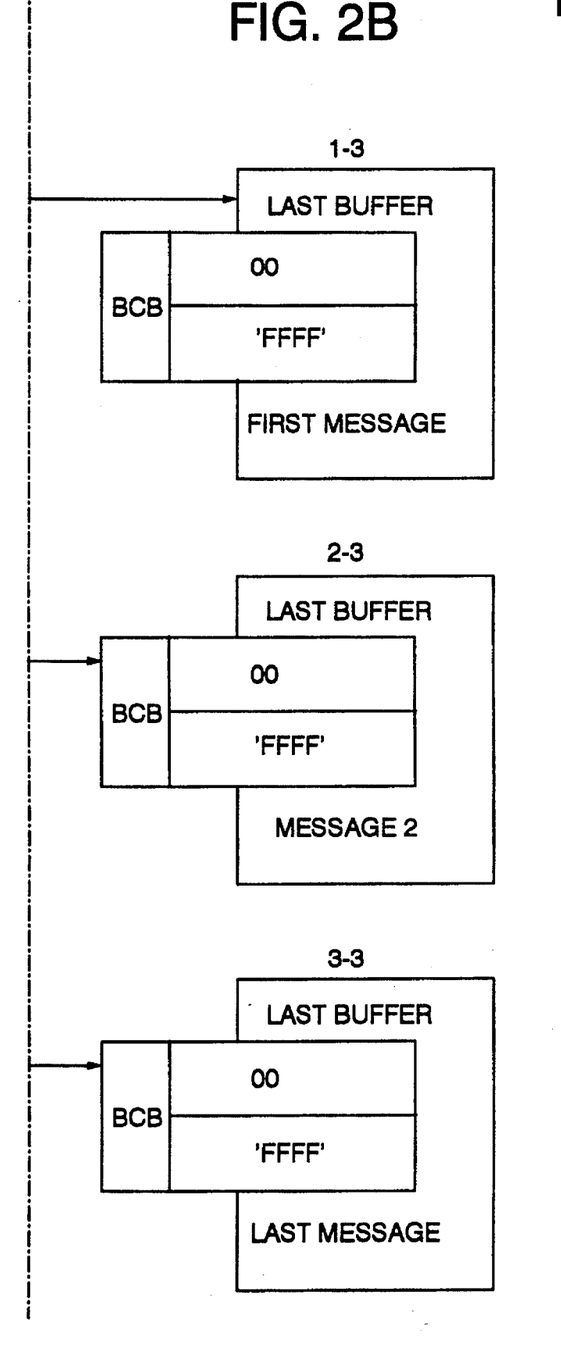

FIG. 2 shows a message queue which comprises three messages. Each message is stored in a chain of buffers comprising at least one buffer. In FIG. 2, the first message is stored in buffers 1-1 to 1-3, the second message is stored in buffers 2-1 to 2-3 and the third message is stored in buffers 3-1 to 3-3. Each buffer is provided with a buffer control block BCB, which comprises a buffer chaining control part for storing at least the address of the next buffer of a message and a message chaining control part which contains the address of the first buffer of the next message. The hexadecimal code "FFFF" in the buffer control part indicates that the buffer is the last buffer of a message, and in the message control part it indicates that the message is the last one in the queue.

The queue control block contains the queue head, i.e. the address of the first buffer (1-1) of the first message and the queue tail i.e. the address of the first buffer (3-1) of the last message.

All the exchange operations between users are performed by enqueueing/ dequeueing messages to/from message queues in memory 10 as described in above referenced patent application, under control of global order machine 32.

Figure 3A:
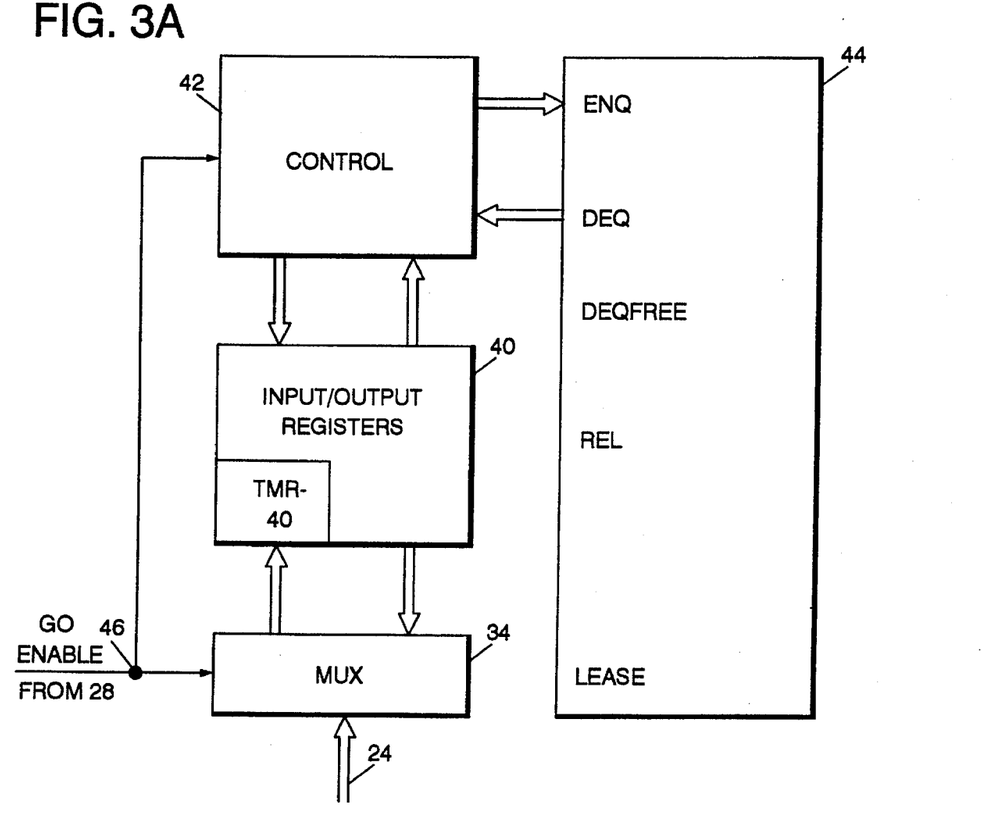
FIGS. 3A shows the global order machine 32 and FIG. 3B shows the format of the global order requests and responses.
Figure 3B:
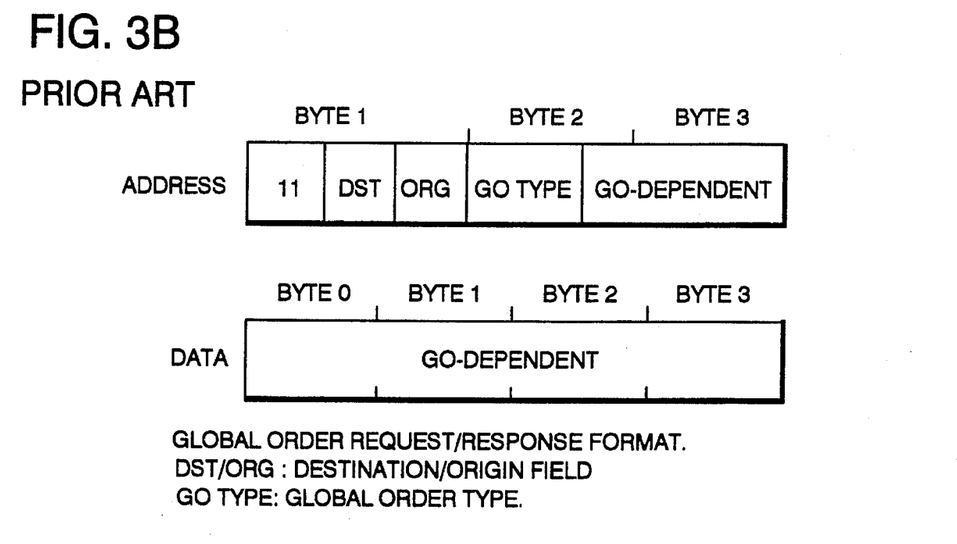

As shown in FIG. 3-A, global order machine 32 comprises multiplexer 34, and input/output registers 40, for storing the address and data bytes which are received from or to be sent on bus 24 according to the request/response formats of the global orders shown in FIG. 3-B. They are also used for saving the information as required during the execution of the global orders.

According to the present invention, a specific register called time mark register TMR-40 is provided; its function will be described later.

Logic circuit 42 is the specific interface between registers 40 and a finite state machine 44 which executes the logical processes implementing the global orders.

Arbiter 28 responds to a global order request from a user by a global order request grant which is the GO enable signal on line 46; the global order request is sent on bus 24.

The general format of the global order requests sent by a requester and of the global order responses sent by global order machine 32 to the requester is shown in FIG. 3-B. In FIGS. 3-A and 3-B GO stands for Global Order.

In FIG. 3-B:

| | |
|---|---|
| Address byte 1: | |
| Bit 0 | : set to 1= memory access mode |
| Bit 1 | : set to 1= global order |
| Bits 2–3–4 | : Global Order Request/Response Destination Identifier DST |
| Bits 5–6–7 | : Global Order Request/Response Origin Identifier ORG |
| Address byte 2: | |
| Bits 0–3 | : global order type |

The other fields of the address and data bytes are global order dependent.

An Enqueue ENQ global order request contains the address of the message, i.e., the address of the first buffer of the message to be enqueued in the GO dependent data bytes 2 and 3 and the queue identification of the queue to which the message is to be enqueued.

The ENQ response contains a return code indicative of the queue status in data bytes 0 and 1.

The Dequeue DEQ global order request contains the identification of the queue from which a message has to be dequeued in address bytes 2 and 3.

The DEQ response contains a return code in data bytes 0 and 1 and the address of the message which has been dequeued.

A Lease global order does not invoke the global order machine 32 but the free buffer supplier 30. It consists in a read operation of the free buffer supplier register which holds the address of a leased buffer ready to be given to the requester. The returned data consists in a return code and the address of the leased buffer given by the free buffer supplier 30.

A Dequeue Free, DEQ-FREE global order is used by the free buffer supplier 30 to fill the leased buffer pool.

The DEQ-FREE request only contains the DEQ-FREE global order type and the DEQ-FREE response contains a return code and the address of the buffer which has been dequeued from the free buffer queue.

A Release REL global order contains the address of the first buffer of the message to be released in data bytes 2 and 3. The response contains a return code.

The processing of these global orders is fully described in the above referenced patent application.

In this environment it may happen that buffers are not released to the free buffer queue due to a fault of the hardware or software users. The present invention allows such lost buffers to be recovered, as described hereafter.

Figure 4:
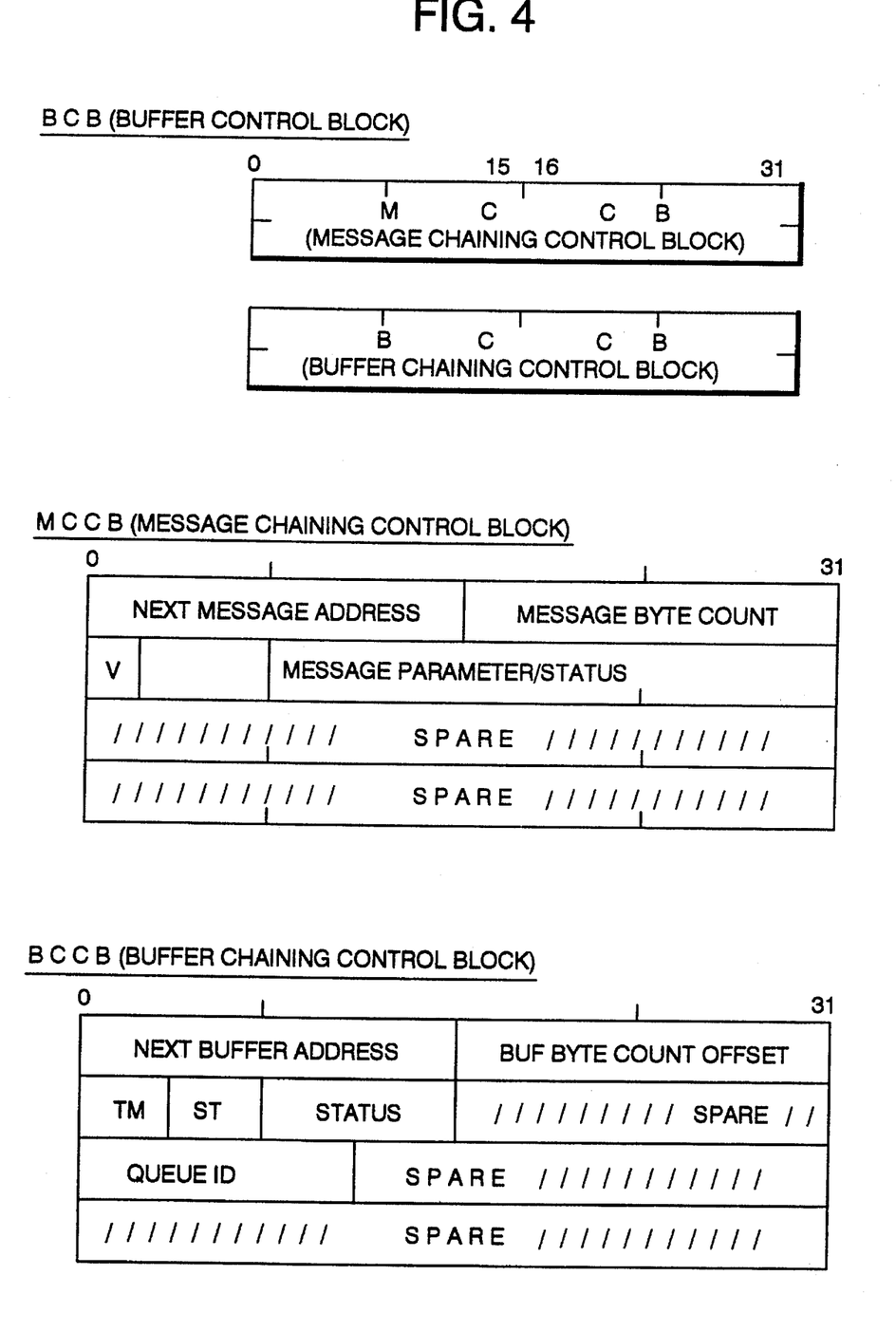
FIG. 4 shows the format of the buffer chaining control blocks and message chaining control blocks forming a buffer control block BCB.

FIG. 4 shows the format of the BCB, comprising the message chaining control part MCCB (Message Chaining Control Block) and buffer chaining control part BCCB (Buffer Chaining Control Block). The formats of the MCCB and BCCB are identical to the formats of the MCCB and BCCB described in above referenced patent application except that the BCCB includes additional fields: ST, TM and QUEUE ID. ST is a state field, TM is a Time Mark field and the QUEUE ID field is a field for storing the identification of the queue (QCB Address) to which the buffer is enqueued as a result of an ENQ global order.

Figure 5:
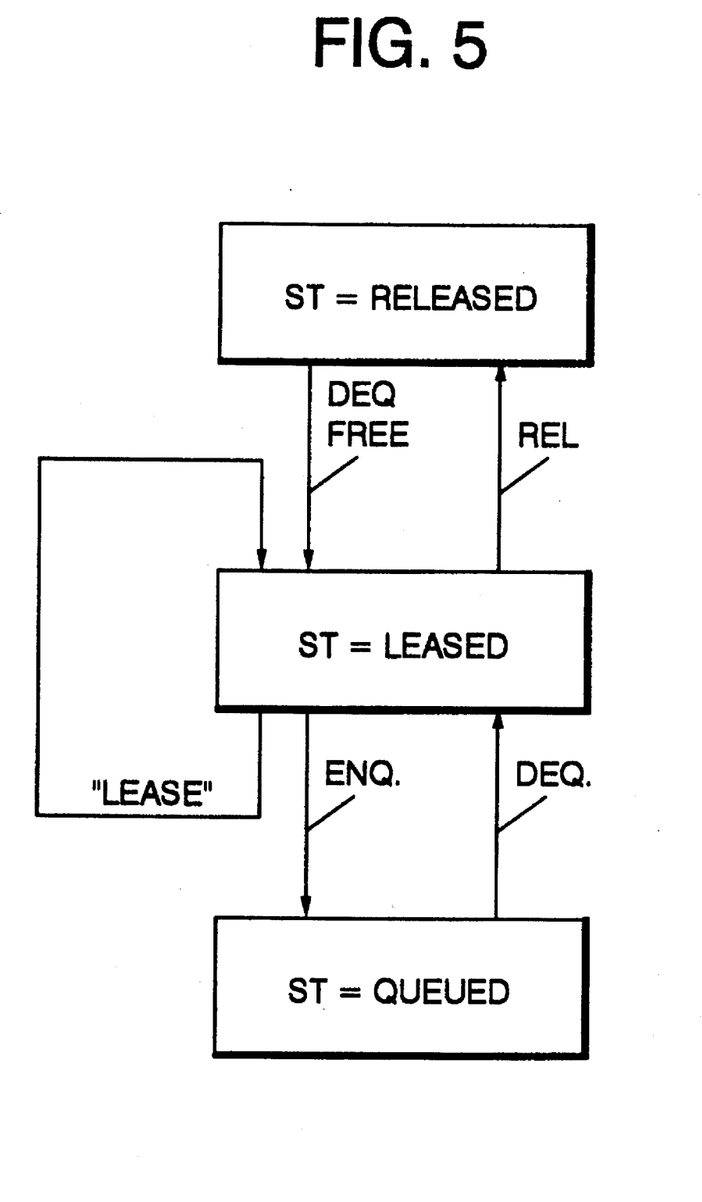
FIG. 5 shows the state changes of a buffer.

The state field reflects the state of the buffer which can be "Released", "Leased" or "Queued". FIG. 5 schematically represents how the state of a buffer changes. At the system initialization, the buffer is in the "Released" state, ST bits= 01, which means that the buffer is in the free buffer queue.

A DEQ-FREE global order which causes the buffer address to be stored into the free buffer pool, changes the state to "Leased" ST=10. A lease global order does not change the state. An ENQUEUE global order changes the state to "Queued" ST=11, and updates the QUEUE ID field in each buffer of the message being enqueued. The QUEUE identification is to contained in the Enqueue global order request. A Dequeue global order changes the state to "Leased", and a Release global order changes the state to "Released", in each buffer of the message being released.

Figure 6:
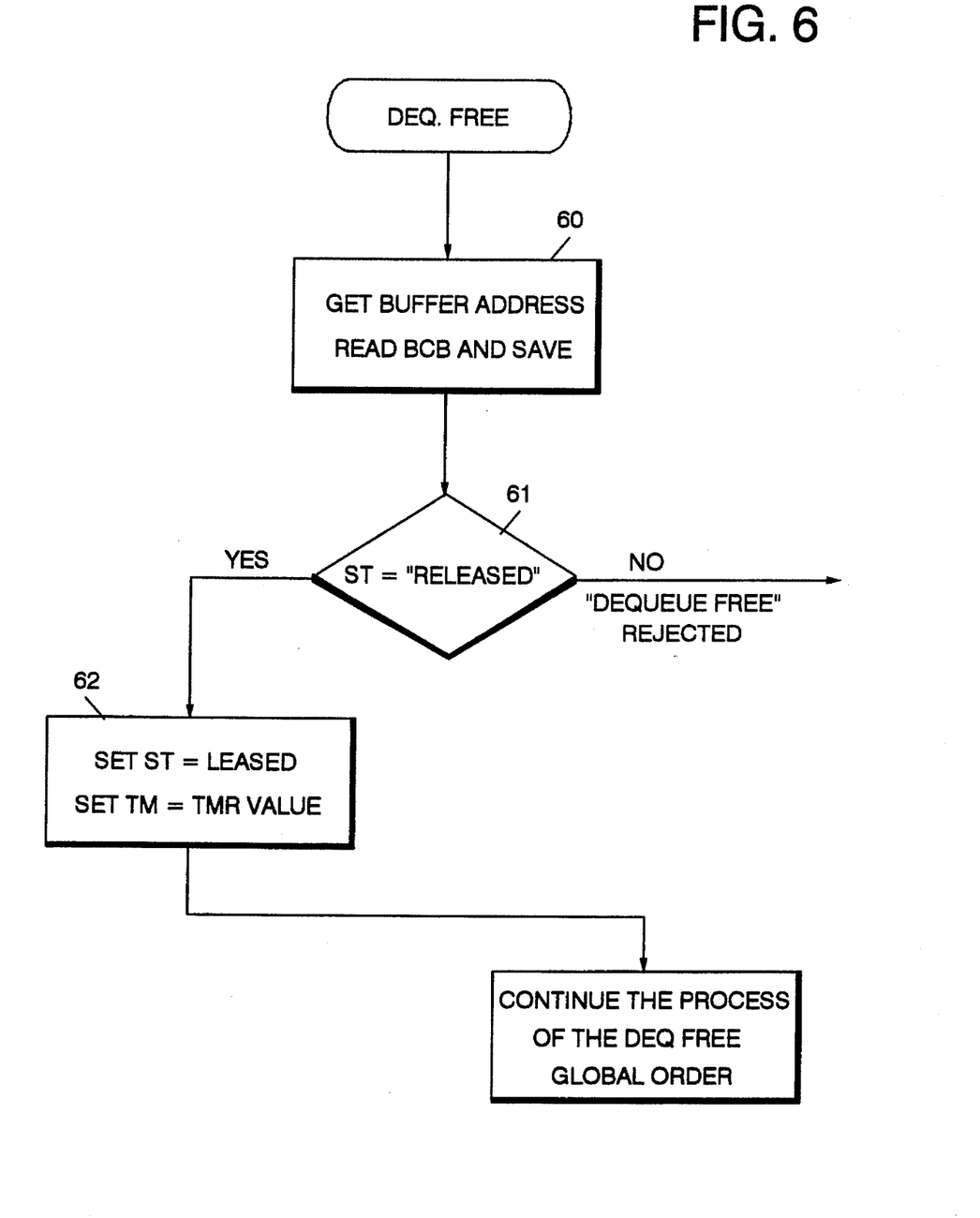
FIG. 6 shows the operations performed by the global order machine to process a Dequeue Free global order.

The time mark register TMR-40 in the global order machine 32 is periodically loaded by the microcode run by processor 14 with the following sequence: 01→10→11→01→10→11 etc. Each time a DEQ-FREE global order is requested by the free buffer supplier, the contents of the time mark register is written into the TM field of the BCCB of the buffer. When a message is released by means of a Release global order, the TM field is kept unchanged for all buffers of the message being released. The processing of the global orders by the global order machine and free buffer supplier 32 and 30 is similar to the processing described in FIGS. 10 to 13 of above referenced patent application, except for some operations which are added or changed to implement the subject invention, as shown in FIGS. 6 to 9. FIG. 6 shows the processing of the DEQ FREE global order. The first operations (160 to 162 shown in FIG. 12 of above referenced patent application), results in the generation of a buffer address. The buffer control block BCB of the buffer is read and saved, operation 60. Then, it is tested by operation 61 if the state field ST is set to "Released". If no, the DEQ-FREE order is rejected, because the normal state (no error) of the buffers in the free buffer queue is "Released".

If the ST field is set to "Released", the ST field is changed to "Leased" and the TM field is set to the value of the TMR register, at operation 62. Then, the DEQ FREE process continues as shown in FIG. 12 of above referenced patent application.

Figure 7:
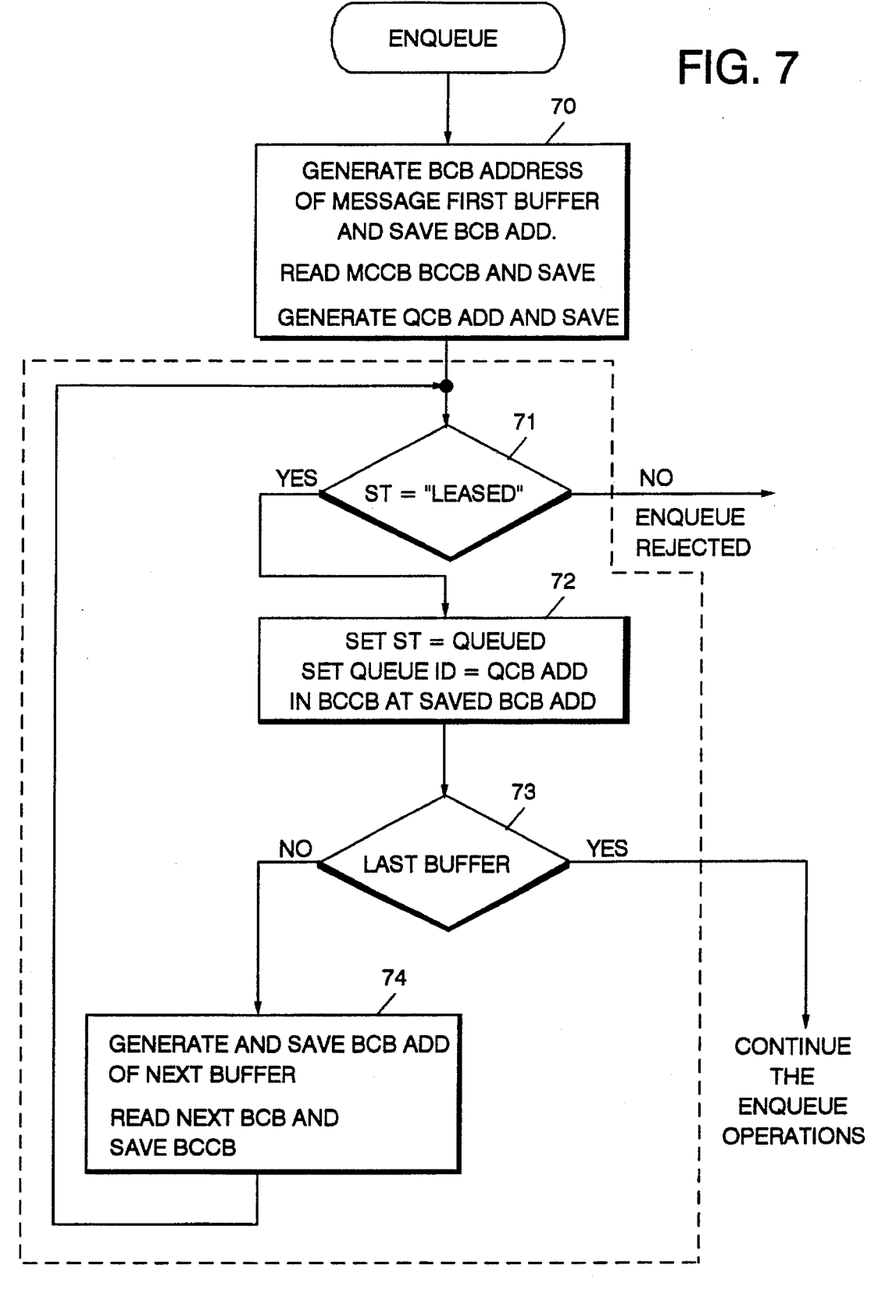
FIG. 7 shows the operations performed by the global order machine to process an Enqueue global order.

FIG. 7 shows the processing of the Enqueue global order. The first operations (110 and 111 shown in FIG. 10 of above referenced patent application), results in the generation of the address of the buffer control block BCB of the first buffer of the message to be enqueued. The address of the buffer BCB is saved. The MCCB and BCCB are read and saved and the address of the queue is generated from the QCB ID in the global order request, operation 70. Then, it is tested by operation 71 if the ST field is "Leased". If no, the Enqueue global order is rejected.

If yes, the ST and QUEUE ID fields in the BCCB stored at the saved BCB address are updated at operation 72. The ST field is set to "Queued" and the QUEUE ID field is set to the QCB ADD computed by operation 70. It is tested at operation 73, whether the next buffer address in the saved BCCB is set to FFFF, in order to determine whether the buffer is the last buffer of the message. If yes, the Enqueue process continues as described in above referenced patent application. If no, the BCB address of the next buffer computed from the saved BCCB is saved, and the BCB control block of the next buffer is read and the BCCB is saved at operation 74.

Then, the process is resumed at 71 by testing the ST field of the saved BCCB, until the ST and QUEUE ID fields of all buffers of the message to be enqueued are updated.

Figure 8:
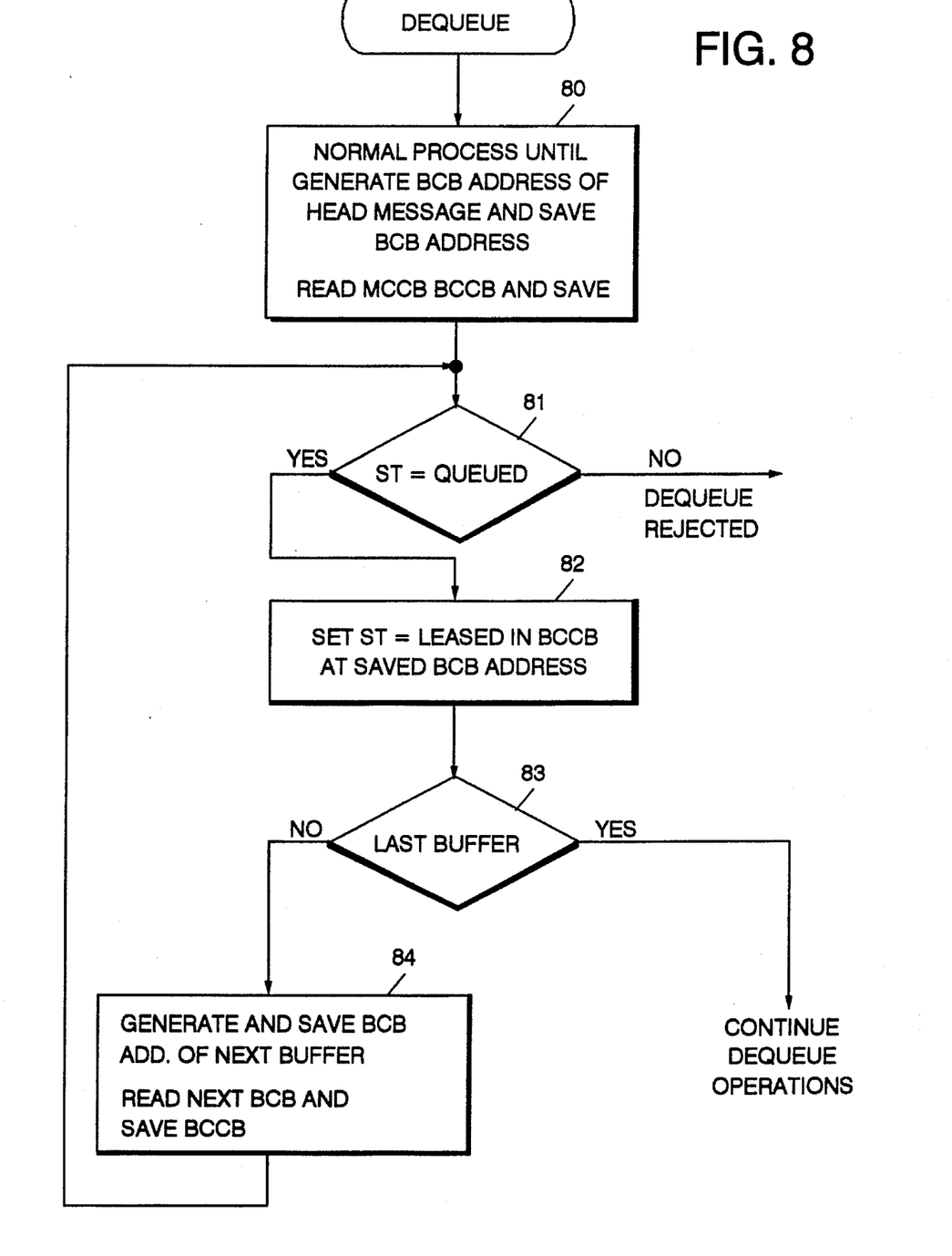
FIG. 8 shows the operations performed by the global order machine to process a Dequeue global order.

The Dequeue operations are shown in FIG. 8. The same operations as shown at 140 to 142 in FIG. 11 of above referenced patent application, are performed until the address of the BCB of the first buffer of the head message is generated. This address is saved and the MCCB and BCCB are read and saved, as shown at 80.

Then, the ST field in the saved BCCB is tested at 81. If it is not found equal to "Queued", the DEQ order is rejected.

If it is found equal to "Queued", the ST field in the BCCB at the saved BCB address is set to "leased" by operation 82. Then, at operation 83 it is tested in the saved BCCB if the next buffer address field is set to FFFF in order to determine whether the buffer is the last buffer of the message. If yes, the normal dequeue operations are performed, until the end of the dequeue process.

If no, the BCB address of the next buffer is generated from the next buffer address contents in the saved BCCB, and the BCB address is saved, the next BCB is read and the BCCB contents is saved, as shown by 84. Then, the operations are resumed at 81, in order to set the ST field of each buffer of the dequeued message to "leased".

Figure 9:
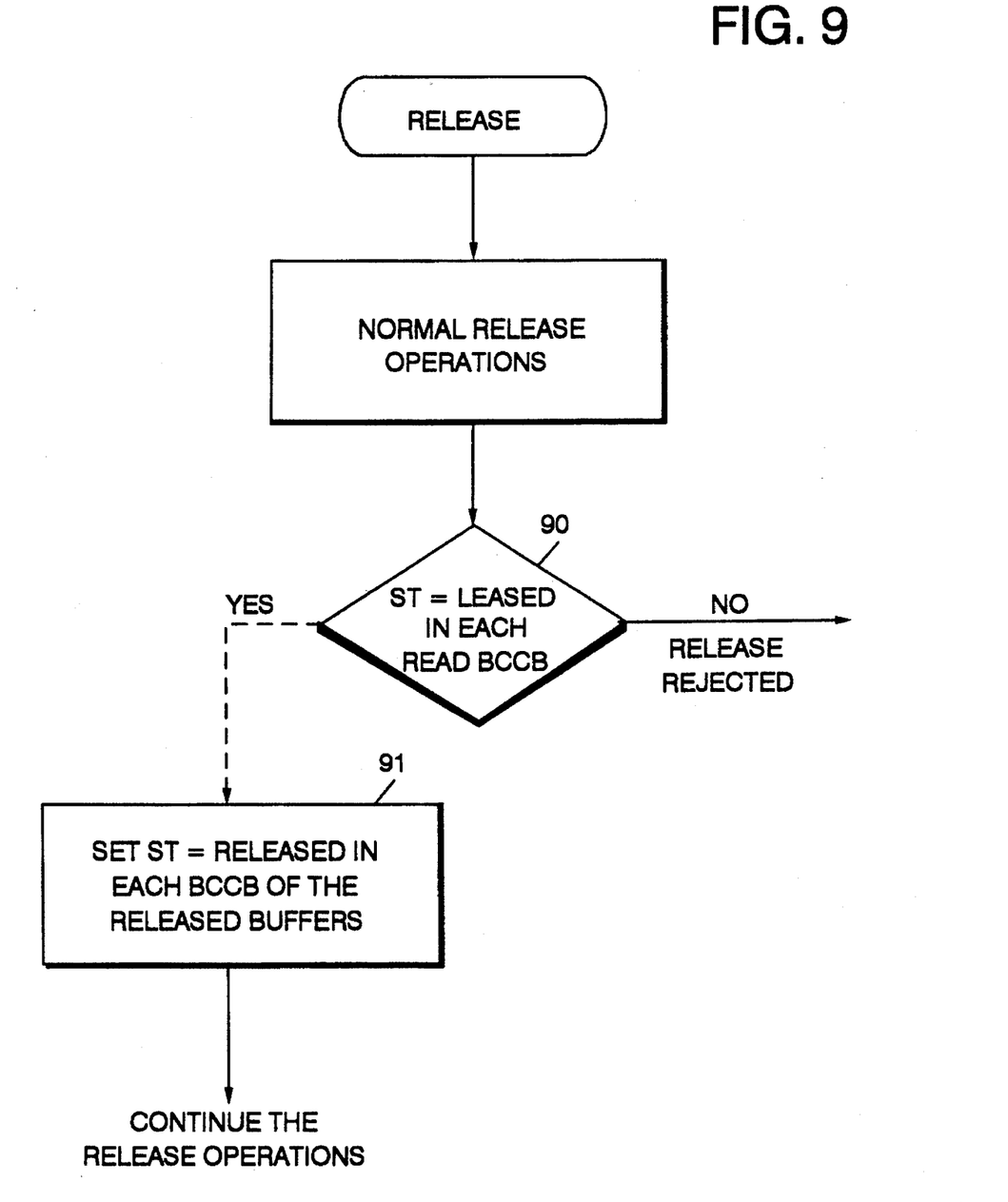
FIG. 9 shows the operations performed by the global order machine to process a Release global order.

The Release operations are shown in FIG. 9 and similar to the operations shown in FIG. 13 of above referenced patent application. In order to implement the subject invention, each time the BCCB of a buffer to be released is read (operations 181 and 194), the ST field is tested before going to the next operation, as shown by 90. If the ST field is different from "leased", the Release order is rejected. In addition, each time the BCCB of a buffer is updated, (operations 193 and 192) the ST field is set to "Released", as shown by 91. Thus, the ST fields of the buffers in the free buffer queue are set to "Released".

Figure 10:
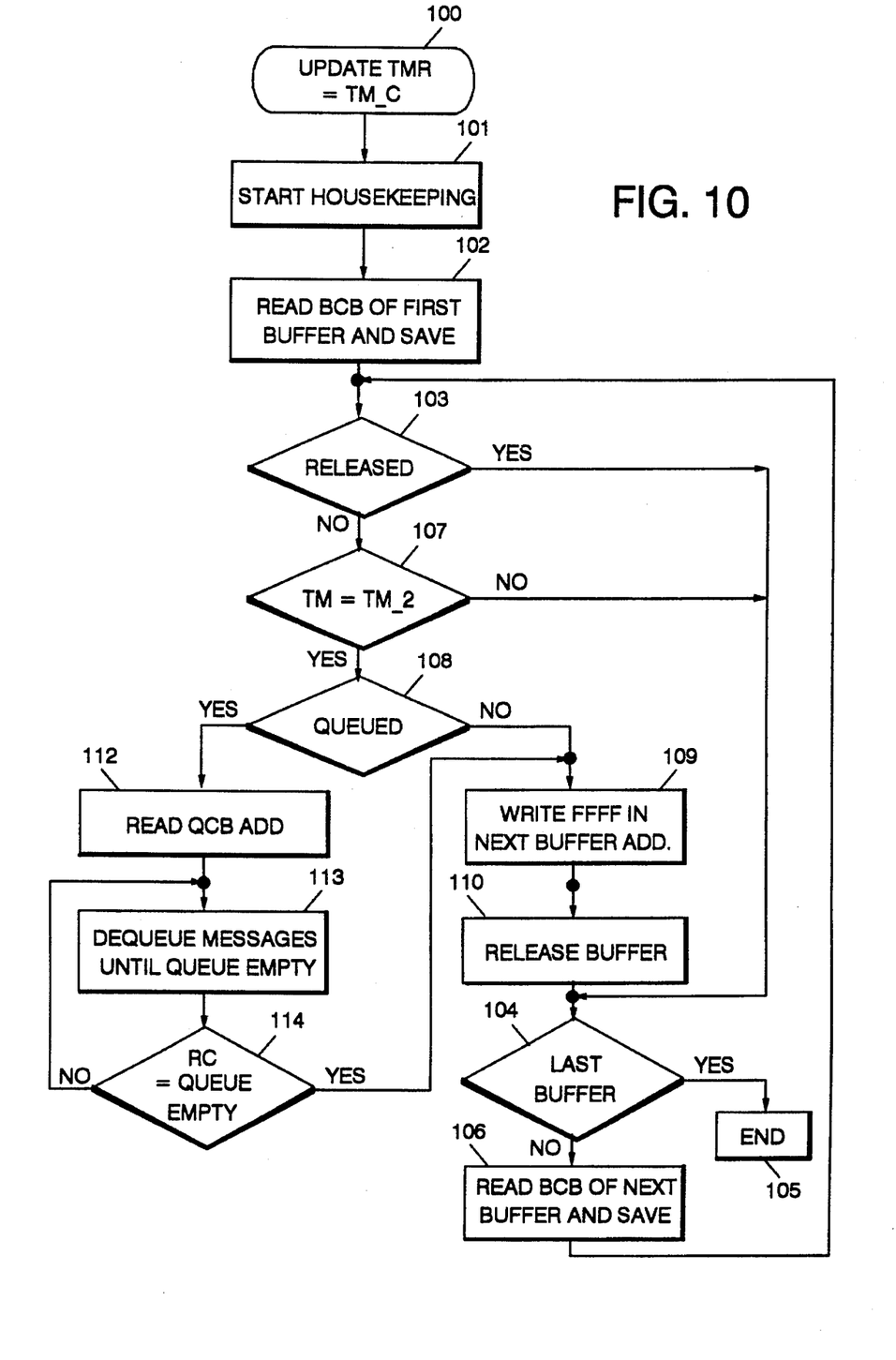
FIG. 10 shows the implementation of the housekeeping task which allows lost buffers to be recovered.

The microprocessor 14 runs a specific application code called "housekeeping" server, which performs the steps shown in FIG. 10, for recovering the lost buffers.

At initialization, the housekeeping server initializes the time mark register TMR with the value "10" and starts a timer with a P value, where P is a given period of time. Then, each time the timer value expires, the TMR register value is changed, according to the sequence previously described.

Assuming TMC is the current TMR value, TM1 and TM 2 are the two previous Time Mark register values in this order. This notation gives the following set of Time Mark register values.

TM2 10 11 01

TM1 11 01 10

TM01 10 11

For example, the housekeeping task is started each time the Time Mark Register value is changed, i.e. each time the Time Mark Register is updated, as shown at 100 and 101 in FIG. 10.

This task consists in scanning all the buffer control blocks sequentially, using the physical addresses of said blocks in each page of the buffered space of the memory 10.

The first step consists in reading the control block BCB of the first buffer at step 102 and saving its contents.

Then, at step 103 the ST field is tested. If it is set to "Released", it is tested at step 104 to determine if the buffer is the last physical buffer. If yes the process is ended as shown by 105. If no, the BCB of the next buffer is read and saved at step 106, and the process resumes at step 103.

If it is found at step 103 that the ST field is not set to "Released", the TM field is tested at step 107, to determine if it is equal to TM2. In case of inequality, the process goes to step 104. In case of equality, it is tested at step 108 if the ST field is set to "Queued". If no, the buffer has to be released, this is done by writing FFFF in the next buffer address field, as shown by step 109, to simulate a dummy message comprising only one buffer, and releasing the buffer at step 110, by sending a Release global order comprising the buffer address as message address. Then, the process goes to step 104.

If, it is found at step 108 that the ST field is in the "Queued" state, all the buffers of the queue to which the current buffer pertains have to be released. To do that, the QUEUE ID field in the BCB saved at step 102 or 106 is read to get the QCB ADDRESS of the queue, as shown at step 112. Then all the messages in the identified queue are dequeued by issuing a set of Dequeue global orders, starting with the queue head in the QCB as message address, and by testing each time a global order response is received if the return code indicates that the queue is empty, as shown by steps 113 and 114. If the queue is not empty, a Dequeue global order is issued with the next message address. This results in the setting of the ST fields of the buffers of the queue to the "Leased" state, so that the buffers of the queue will be released when processed by the housekeeping task at steps 108,109 and 110. When the global order response indicates that the queue is empty, as shown by step 114, the step 109 is entered to release the current buffer.

Through the provision of the TM and ST fields, a time credit comprised between P and 2P is given to each buffer at DEQFREE time. The buffers which are not released within this time period, due to any malfunctioning such as a default in the dequeue mechanism or because an application has lost track of some messages due to a pointer not saved or destroyed, are recovered, i.e. placed in the free buffer queue.

In addition, an application can request to keep a number of buffers permanently assigned, called everlasting buffers herein which are not released by to the housekeeping server.

Figure 11:
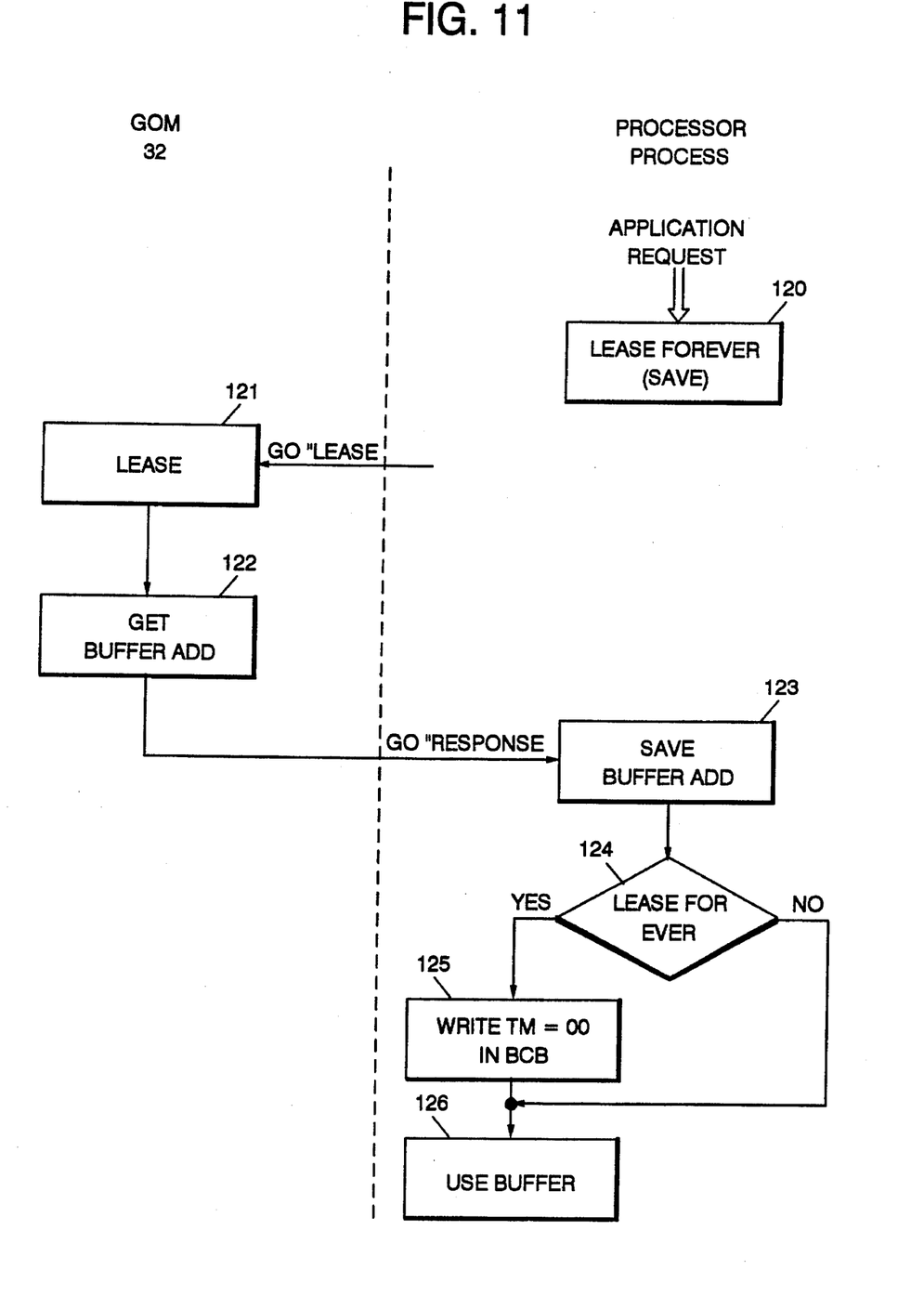
FIG. 11 shows how permanently assigned buffers can be allocated to an application.

The application requests a "lease forever" (i.e. permanently assigned buffer) to the processor, as shown in FIG. 11, in box 120. The request is saved and the processor sends a lease global order to the global order machine 32.

The lease global order is received by machine 32, step 121. It is processed by the machine 32 which gets a buffer address from the free buffer pool, step 122 and sends the global order response to the processor. The buffer address is saved, step 123. The next step 124 consists in testing whether the lease request is a lease forever request. If no, the buffer is used as shown at 126. If yes, the TM field is set to "00" in the BCB of the buffer as shown at step 125.

Because the TM field of the permanently assigned (everlasting) buffers are set to 00 through the above described process, they will not be released by the housekeeping task, because of the test at step 107 in FIG. 10 which will result in an inequality.

The present invention has been described assuming that the time mark register takes three different values. It will be obvious for the man skilled in the art to implement the subject invention with more than three values.

We claim:

1. An apparatus for recovering buffer contents in a data processing system through which source and destination users exchange information comprising a memory divided into a plurality of buffers provided with buffer control blocks, buffer management means which are responsive to requests from users for allocating buffers to source users in order for said source users to store the information to be sent to the destination users, said buffer management means building buffer queues and dequeuing buffers from said queues to send the information contained therein to said destination users and for releasing said buffers afterwards, said apparatus comprising:

time mark storing means settable to n different values in a predetermined order, the value of said time mark storing means being changed at the expiration of a time period P, time marking means for writing the current value of the time mark storing means into a time mark field of the buffer control blocks when the buffers are allocated to users, state field writing means for writing into a state field of the buffer control blocks, a first value when the buffers are allocated to users, a second value when the buffers are released and a third value when the buffers pertain to a queue, scanning means for reading the contents of said buffer control blocks at regular time intervals t separated by said period P, and for testing if the state field of each buffer control block is set to said second value and, if not so set, for comparing said time mark field with the value said time mark storing means had at the time t-xP, where x is a number in the range 1<x<n, and then releasing the corresponding buffer in case of equality, said scanning means further testing whether said state field of each buffer control block is set to said third value, and if so set, dequeuing all said buffers of said queue to which said buffers pertain.

2. The apparatus according to claim 1 wherein n is equal to 3 and x is equal to 2.

3. The apparatus according to claim 1, wherein said buffers for which said scanning means found said state field equal to said third value are released once said buffers of said queue have been dequeued.

4. The apparatus according to any one of claims 1 to 3, including, when a user makes a special request for the allocation of permanently assigned buffer, means for setting said time mark field of said buffer control block of said permanently assigned buffer when allocated to said one user to a value different from said n values settable by the time mark storing means, whereby the corresponding said buffer is not released by said scanning means.

* * * * *